(12) United States Patent
Huang et al.

(10) Patent No.: US 11,798,314 B1
(45) Date of Patent: Oct. 24, 2023

(54) FINGERPRINT IDENTIFICATION METHOD AND APPARATUS

(71) Applicant: NOVATEK MICROELECTRONICS CORP., Hsinchu (TW)

(72) Inventors: Min Huang, Taoyuan (TW); Chi-Ting Chen, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/112,119

(22) Filed: Feb. 21, 2023

Related U.S. Application Data

(60) Provisional application No. 63/354,208, filed on Jun. 21, 2022.

(30) Foreign Application Priority Data

Oct. 18, 2022 (CN) .......................... 202211272047.4

(51) Int. Cl.
    *G06V 40/13* (2022.01)
    *G06V 10/141* (2022.01)
    *G06V 10/98* (2022.01)
    *G06F 3/041* (2006.01)

(52) U.S. Cl.
    CPC ........ *G06V 40/1318* (2022.01); *G06V 10/141* (2022.01); *G06V 10/98* (2022.01); *G06F 3/041* (2013.01)

(58) Field of Classification Search
    CPC .. G06V 40/1318; G06V 10/141; G06V 10/98; G06F 3/041
    See application file for complete search history.

(56) References Cited

U.S. PATENT DOCUMENTS

| | | | |
|---|---|---|---|
| 2019/0102598 A1* | 4/2019 | Jiang | G06V 40/1365 |
| 2021/0248343 A1* | 8/2021 | Wu | G06F 1/3215 |

FOREIGN PATENT DOCUMENTS

| | | |
|---|---|---|
| CN | 101309359 A | 11/2008 |
| CN | 109543558 A | 3/2019 |
| CN | 110582780 A | 12/2019 |
| CN | 113177516 A | 7/2021 |
| CN | 107820617 B | 9/2021 |

\* cited by examiner

*Primary Examiner* — Abhishek Sarma
(74) *Attorney, Agent, or Firm* — MARSHALL, GERSTEIN & BORUN LLP

(57) ABSTRACT

Embodiments of the present disclosure provide a fingerprint identification method, apparatus, and an electronic product. The method comprises: acquiring a touch signal of a finger to be identified on a display component; determining a touch zone; determining a fingerprint identification bright zone and a fingerprint identification dark zone on the display component based on the touch zone, wherein the fingerprint identification dark zone is close to and at least partially surrounds the fingerprint identification bright zone; and performing a fingerprint identification of the finger to be identified based on a bright zone fingerprint detection signal corresponding to the fingerprint identification bright zone and a dark zone fingerprint detection signal corresponding to the fingerprint identification dark zone. The interference during under-screen fingerprint identification can be effectively reduced and the accuracy of under-screen fingerprint identification can be improved through the fingerprint identification method of the present disclosure.

20 Claims, 11 Drawing Sheets

FINGERPRINT IDENTIFICATION METHOD AND APPARATUS

CROSS-REFERENCE TO RELATED APPLICATIONS

This Patent Application claims priority to Chinese Application No. 202211272047.4, filed Oct. 18, 2022, and to U.S. Provisional Application No. 63/354,208, filed on Jun. 21, 2022. All of the aforementioned applications are incorporated herein by reference in their entireties.

TECHNICAL FIELD

The present disclosure relates to the field of identification technique, and more particularly, to a fingerprint identification method, apparatus, and an electronic product including the fingerprint identification apparatus.

BACKGROUND

With the development of portable devices such as smart phones, the demand for personal identity (ID) identification is increasing. Among the personal ID identification techniques, the fingerprint identification technique is considered as one of the most promising personal ID identification techniques at present, with device cost, size and identification accuracy etc. being taken into consideration. The fingerprint identification technique has been widely applied in various electronic products, such as mobile phones, notebook computers, tablet computers, Personal Digital Assistant (PDA), portable electronic devices, etc., so as to realize ID identification. Users can be conveniently identified by fingerprint identification, users only need to place their finger on the fingerprint identification panel or zone, and then users can log in to the electronic devices, without entering lengthy and cumbersome user names and passwords.

As the most popular fingerprint identification technique at present, the under-screen fingerprint identification technique has the advantages of convenient use, good integration with electronic products, small size, and wide application range and so on. The under-screen fingerprint identification technique uses the under-screen fingerprint sensing technique to embed the array of fingerprint sensors in the display panel, such that the fingerprint sensing zone is located in the display zone of the display panel. At present, under-screen fingerprint identification requires high accuracy of the fingerprint detection signal, it is easy to cause an incorrect fingerprint identification result if there is signal interference. Therefore, how to improve the accuracy of under-screen fingerprint identification is still a hot topic in current research.

SUMMARY

In order to solve the above problems, the present disclosure provides a fingerprint identification method, comprising: acquiring a touch signal of a finger to be identified on a display component; determining a touch zone of the finger to be identified based on the touch signal; determining a fingerprint identification bright zone and a fingerprint identification dark zone on the display component based on the touch zone, wherein the fingerprint identification dark zone is close to and at least partially surrounds the fingerprint identification bright zone; acquiring a bright zone fingerprint detection signal corresponding to the fingerprint identification bright zone and a dark zone fingerprint detection signal corresponding to the fingerprint identification dark zone; and performing a fingerprint identification of the finger to be identified based on the bright zone fingerprint detection signal and the dark zone fingerprint detection signal.

The interference during under-screen fingerprint identification can be effectively reduced and the accuracy of under-screen fingerprint identification can be improved through the fingerprint identification method of the present disclosure.

According to the embodiments of the present disclosure, the fingerprint identification method further comprises: performing a true/false finger detection of the finger to be identified based on the bright zone fingerprint detection signal and the dark zone fingerprint detection signal.

According to the embodiments of the present disclosure, the fingerprint identification of the finger to be identified may be performed based on a difference between the bright zone fingerprint detection signal and the dark zone fingerprint detection signal.

According to the embodiments of the present disclosure, the fingerprint identification of the finger to be identified may be performed based on a difference between a single fingerprint detection signal of the fingerprint identification bright zone and a single fingerprint detection signal of the fingerprint identification dark zone; or, the fingerprint identification of the finger to be identified may be performed based on a difference between a single fingerprint detection signal of the fingerprint identification bright zone and an average of a plurality of fingerprint detection signals of the fingerprint identification dark zone; or, the fingerprint identification of the finger to be identified may be performed based on a difference between an average of a plurality of fingerprint detection signals of the fingerprint identification bright zone and an average of a plurality of fingerprint detection signals of the fingerprint identification dark zone, wherein the average is an arithmetic average or a weighted average.

According to the embodiments of the present disclosure, the bright zone fingerprint detection signal includes a first bright zone fingerprint detection signal corresponding to a convex part of the fingerprint and a second bright zone fingerprint detection signal corresponding to a concave part of the fingerprint, and the dark zone fingerprint detection signal includes a first dark zone fingerprint detection signal corresponding to a convex part of the fingerprint and a second dark zone fingerprint detection signal corresponding to a concave part of the fingerprint, wherein performing a true/false finger detection of the finger to be identified based on the bright zone fingerprint detection signal and the dark zone fingerprint detection signal further comprises: performing a true/false finger detection of the finger to be identified based on a first difference between the first bright zone fingerprint detection signal and the second bright zone fingerprint detection signal corresponding to the fingerprint identification bright zone, and a second difference between the first dark zone fingerprint detection signal and the second dark zone fingerprint detection signal corresponding to the fingerprint identification dark zone.

According to the embodiments of the present disclosure, the fingerprint identification method further comprises: determining that the finger to be identified is a true finger in any one of the following situations: the first difference is greater than the second difference; a difference between the first difference and the second difference is greater than a first threshold; a ratio of the first difference to the second difference is greater than a second threshold; a ratio of a difference between the first difference and the second difference to the first difference or the second difference is greater than a third threshold.

According to the embodiments of the present disclosure, the first bright zone fingerprint detection signal, the second bright zone fingerprint detection signal, the first dark zone fingerprint detection signal and the second dark zone fingerprint detection signal are acquired by detecting light with a specific wavelength.

According to the embodiments of the present disclosure, the fingerprint identification bright zone is a circular zone, an elliptical zone or a rectangular zone, and the fingerprint identification dark zone includes a plurality of rows or columns of display pixels adjacent to a part of display pixels at the outermost periphery of the fingerprint identification bright zone, wherein during fingerprint identification, display pixels in the fingerprint identification bright zone are controlled to emit light, and display pixels in the fingerprint identification dark zone are controlled to not emit light, or, during fingerprint identification, brightness of display pixels in the fingerprint identification bright zone is controlled to be higher than that of display pixels in the fingerprint identification dark zone.

According to the embodiments of the present disclosure, the display component includes a plurality of display sub-zones, each display sub-zone includes a plurality of display pixels, the fingerprint identification bright zone is associated with at least one display sub-zone of the plurality of display sub-zones, and the fingerprint identification dark zone is associated with at least one display sub-zone of the plurality of display sub-zones.

According to the embodiments of the present disclosure, determining a fingerprint identification bright zone and a fingerprint identification dark zone on the display component based on the touch zone further comprises: determining a center of the touch zone; determining the fingerprint identification bright zone by taking the center of the touch zone as an origin; and taking a plurality of rows or columns of display pixels adjacent to a part of display pixels at the outermost periphery of the fingerprint identification bright zone as the fingerprint identification dark zone, wherein an area of the fingerprint identification bright zone is a preset area, or an area of the fingerprint identification bright zone is determined according to an area of the touch zone and is greater than or equal to a first area threshold.

According to the embodiments of the present disclosure, determining a fingerprint identification bright zone and a fingerprint identification dark zone on the display component based on the touch zone further comprises: determining an edge zone of the touch zone; determining at least part of the edge zone as the fingerprint identification dark zone; and determining the fingerprint identification bright zone based on the fingerprint identification dark zone and the touch zone.

According to the embodiments of the present disclosure, the fingerprint identification method further includes: determining an area of the touch zone; wherein the edge zone of the touch zone is determined based on the touch zone in a case where the area of the touch zone is smaller than a second area threshold.

The embodiments of the present disclosure further provide a fingerprint identification apparatus used to be arranged below a display component, comprising: a control circuit configured to acquire a touch signal of a finger to be identified on the display component, determine a touch zone of the finger to be identified based on the touch signal, and provide a light emission control signal to the display component based on the determined touch zone, the light emission control signal is used to control the display component to form a fingerprint identification bright zone and a fingerprint identification dark zone, wherein the fingerprint identification dark zone is close to and at least partially surrounds the fingerprint identification bright zone; the control circuit is further configured to acquire a bright zone fingerprint detection signal corresponding to the fingerprint identification bright zone and a dark zone fingerprint detection signal corresponding to the fingerprint identification dark zone, and perform a fingerprint identification of the finger to be identified based on the bright zone fingerprint detection signal and the dark zone fingerprint detection signal.

According to the embodiments of the present disclosure, the fingerprint identification apparatus further comprises: an array of optical sensing units, wherein each optical sensing unit is used to receive light reflected by the finger to be identified and convert an optical signal into an electrical signal; wherein the bright zone fingerprint detection signal is an electrical signal generated by optical sensing units corresponding to the fingerprint identification bright zone, and the dark zone fingerprint detection signal is an electrical signal generated by optical sensing units corresponding to the fingerprint identification dark zone.

The embodiments of the present disclosure further provide an electronic product which realizes fingerprint identification by the fingerprint identification method as described above.

The present disclosure provides a fingerprint identification method and apparatus, and an electronic product including the fingerprint identification apparatus. The interference during under-screen fingerprint identification can be effectively reduced and the accuracy of under-screen fingerprint identification can be improved through the fingerprint identification method of the present disclosure. Meanwhile, the fingerprint identification method of the present disclosure can realize the detection of a true/false finger by only one time of fingerprint scan, thereby improve the efficiency of true/false finger detection. In addition, the fingerprint identification method of the present disclosure does not make too many changes to the hardware of the electronic product, and has the advantages of good compatibility, small size, and wide application scenarios.

BRIEF DESCRIPTION OF THE DRAWINGS

In order to explain the technical solutions of the embodiments of the present disclosure more clearly, the drawings needed in the description of the embodiments will be briefly introduced below. Obviously, the drawings in the following description are only some exemplary embodiments of the present disclosure. For those of ordinary skill in the art, other drawings may be obtained according to these drawings without any creative effort.

Here, in the drawings.

DETAILED DESCRIPTION OF THE EMBODIMENTS

Figure 1:
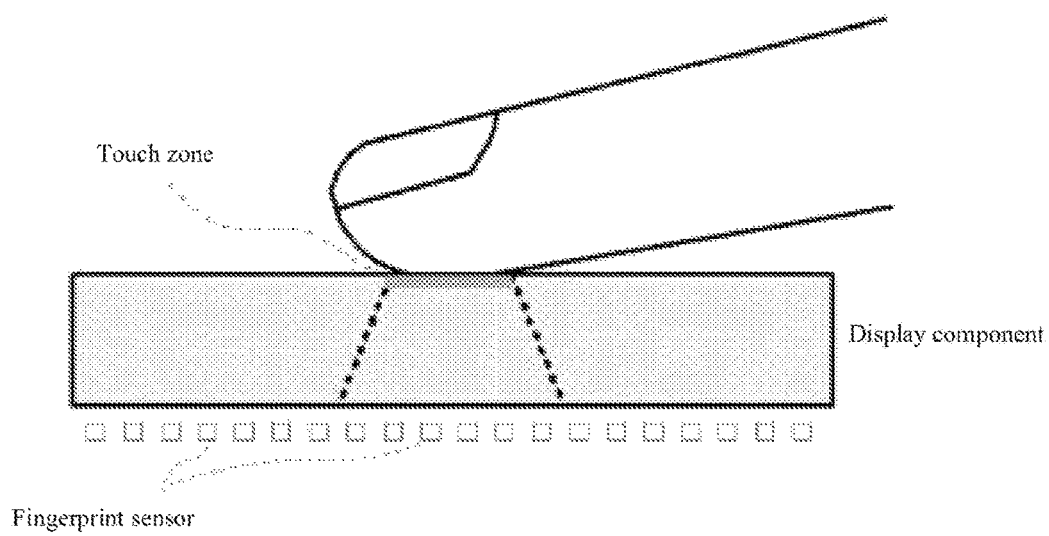
FIG. 1 is a schematic diagram illustrating a fingerprint identification scenario according to the embodiments of the present disclosure.

In order to make the objectives, technical solutions and advantages of the present application more apparent, the exemplary embodiments according to the present disclosure will be described in detail below with reference to the drawings. Obviously, the described embodiments are only a part of the embodiments of the present application, rather than all the embodiments of the present application, and it should be understood that the present application is not limited by the exemplary embodiments described herein.

Furthermore, in the specification and the drawings, steps and elements that are substantially the same or similar are denoted by the same or similar reference signs, and repeated descriptions of these steps and elements will be omitted.

Furthermore, in the specification and the drawings, elements are described in singular or plural forms according to the embodiments. However, the singular and plural forms are appropriately selected for the proposed situations only for convenience of explanation, not intended to limit the present disclosure thereto. Therefore, singular forms may include plural forms, and plural forms may also include singular forms, unless the context clearly indicates otherwise.

Furthermore, in the specification and the drawings, the involved terms "first/second" are only used to distinguish similar objects, and do not represent a specific order of objects. Understandably, "first/second" may be interchanged in a specific order or sequence when allowed, so that the embodiments of the present disclosure described here may be implemented in an order other than those illustrated or described herein.

Furthermore, in the specification and the drawings, the adopted terms such as "upper", "lower", "vertical" and "horizontal", etc. which relate to orientation or positional relationship are used only for describing the embodiments conveniently according to the present disclosure, and are not intended to limit the present disclosure thereto. Therefore, they should not be construed as a limitation to the present disclosure.

Furthermore, in the specification and the drawings, unless otherwise specified, "connection" does not necessarily mean "direct connection" or "direct contact". Here, "connection" may mean both the function of fixation and electrical communication.

Fingerprint identification technique is one of many biometric identification techniques. The so-called biometric identification technique refers to using the inherent physiological features or behavioral features of the human body to realize personal ID identification. Due to the convenience and security advantages of biometrics identification, the biometric identification technique has wide application prospects in the fields of ID authentication and identification and network security. The available biometric identification technique includes fingerprint, face, voiceprint, iris, etc., wherein fingerprint is the most widely used one. In recent years, the fingerprint identification technique has been applied to smart phones, tablets, smart bracelets, wearable electronic devices, smart entrance guard and other electronic products, and has become an important basic technique to support electronic product unlocking and online payment. In the future, based on protocols such as FIDO, biometric identification techniques such as fingerprint identification, etc., will fully replace the existing cryptographic system. With the emergence and popularization of the optical fingerprint acquisition technique, the on-site rapid acquisition and verification of fingerprint has been promoted. With the application of the fingerprint identification technique in mobile devices, the rapid development of the small-sized and ultra-thin fingerprint acquisition technique has been promoted.

As an example, the present disclosure relates to the fingerprint identification technique, and the embodiments of the present disclosure will be further described below with reference to the drawings.

FIG. 1 is a schematic diagram illustrating a fingerprint identification scenario according to the embodiments of the present disclosure.

As shown in FIG. 1, in the under-screen fingerprint identification scenario, the finger to be detected only needs to touch the display component of the electronic product (i.e., to touch the display screen), and then the fingerprint sensor distributed under the display component or integrated with the display component can realize acquisition and processing of the fingerprint detection signal. Optionally, after detecting the touch signal of the finger to be identified, a part of zone on the display component corresponding to the touch zone can be controlled to emit light based on the touch zone, thereafter the fingerprint signal corresponding to the touch zone is acquired to realize fingerprint identification.

It should be understood that, the electronic products in the present disclosure may refer to electronic devices with a touch screen, such as mobile phones, computers, and tablet computers, etc.

Figure 2A:
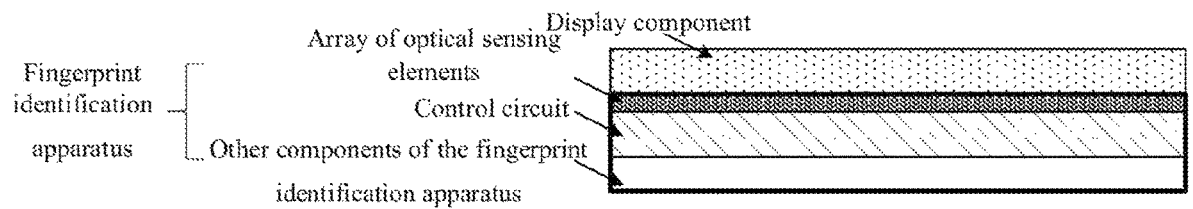
FIGS. 2A to 2C are schematic diagrams illustrating an electronic product according to the embodiments of the present disclosure.

More specifically, FIG. 2A is a schematic cross-sectional view illustrating an electronic product according to the embodiments of the present disclosure.

As shown in FIG. 2A, the electronic product may include a display component and a fingerprint identification apparatus, wherein the fingerprint identification apparatus is arranged below the display component.

The fingerprint identification apparatus may include a control circuit (e.g., an integrated circuit (IC), etc.) and an array of optical sensing units, wherein the control circuit is used to control the fingerprint identification process, and each optical sensing unit is used to receive light reflected by the finger to be identified and convert an optical signal into an electrical signal.

Optionally, encapsulation of the control circuit may be implemented by utilizing the Chip on Film (COF) technique, so as to make the electronic product more miniaturized and lighter.

Optionally, the fingerprint identification apparatus may further include other components, for example, a component for structural fixing, a component for connecting with other components of electronic products, and so on.

It should be understood that FIG. 2A only shows an example of the structure of the display component and the fingerprint identification apparatus, the structure of the display component and the fingerprint identification apparatus may also be in other forms.

Figure 2B:
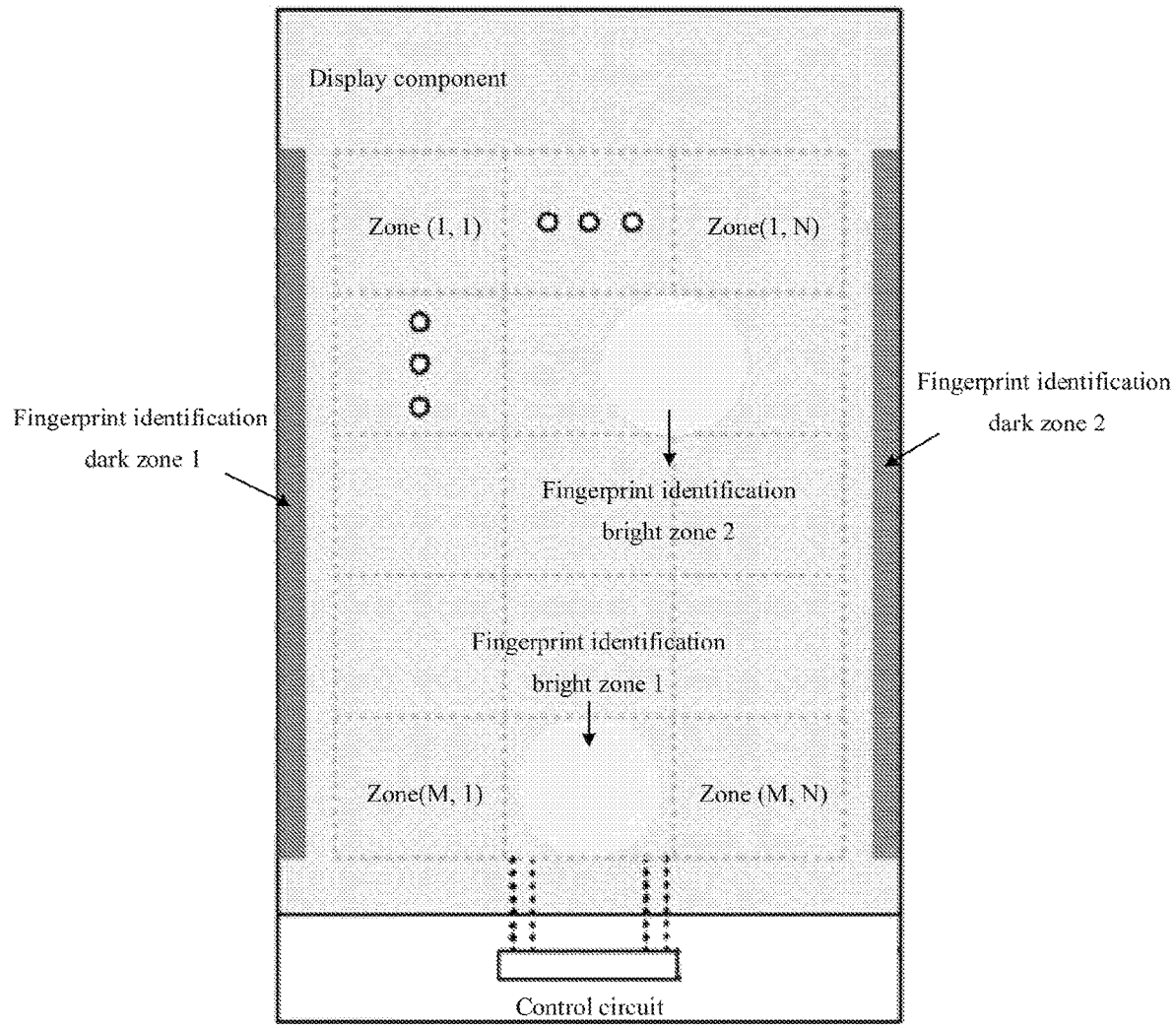

FIG. 2B is a front view illustrating an electronic product in which a fingerprint identification dark zone is located at an edge of a display component according to the embodiments of the present disclosure. For the electronic product shown in FIG. 2B, the display component and the fingerprint identification apparatus (including the control circuit and the array of optical sensing elements) thereof may be arranged in the manner shown in FIG. 2A.

For the example shown in FIG. 2B, the control circuit may be configured to: acquire a touch signal of a finger to be identified on the display component, determine a touch zone of the finger to be identified based on the touch signal, and provide a light emission control signal to the display component based on the determined touch zone, the light emission control signal is used to control the display component to form a fingerprint identification bright zone. In addition, the control circuit may also be configured to: acquire a bright zone fingerprint detection signal corresponding to the fingerprint identification bright zone, and perform a fingerprint identification of the finger to be identified based on the bright zone fingerprint detection signal; or, the control circuit may also be configured to: acquire a bright zone fingerprint detection signal corresponding to the fingerprint identification bright zone and a dark zone fingerprint detection signal corresponding to the fingerprint identification dark zone located at an edge zone of the display component, and to perform a fingerprint identification of the finger to be identified based on the bright zone fingerprint detection signal and the dark zone fingerprint detection signal. It should be noted that, for the example shown in FIG. 2B, the dark zone fingerprint detection signal is only used as a reference signal for performing the fingerprint identification based on the fingerprint identification bright zone, and the dark zone fingerprint detection signal per se does not contain fingerprint information of the finger to be identified.

For the example shown in FIG. 2B, each optical sensing unit in the array of optical sensing units is used to receive light reflected by the finger to be identified and convert an optical signal into an electrical signal; wherein the bright zone fingerprint detection signal is an electrical signal generated by optical sensing units corresponding to the fingerprint identification bright zone.

As shown in FIG. 2B, the fingerprint identification dark zone is located at the edge of the display component, and its position does not change with the position of the touch zone. After detecting the touch signal of the finger to be identified, the fingerprint identification apparatus determines the touch zone of the finger to be identified based on the touch signal, and determines the fingerprint identification bright zone on the display component based on the touch zone.

Optionally, the display component may include a plurality of display sub-zones (as shown in the zone (1, 1) to zone (M, N) in FIG. 2B), each display sub-zone includes a plurality of display pixels, and the fingerprint identification bright zone may be associated with one display sub-zone (e.g., as shown in the fingerprint identification bright zone 1 in FIG. 2B), or may also be associated with a plurality of display sub-zones (e.g., as shown in the fingerprint identification bright zone 2 in FIG. 2B). In a case where the touch zone is associated with one display sub-zone, the touch zone in the one display sub-zone may be configured as the fingerprint identification bright zone; in a case where the touch zone is associated with a plurality of display sub-zones, the touch zones in the plurality of display sub-zones may be combined to form the fingerprint identification bright zone.

During fingerprint identification, the display pixels in the fingerprint identification bright zone are controlled to emit light, and the display pixels in the fingerprint identification dark zone are controlled to not emit light. According to the embodiments of the present disclosure, brightness of the fingerprint identification bright zone may be higher than brightness at which the display component displays an image, and brightness of the fingerprint identification dark zone may be lower than brightness at which the display component displays an image.

Figure 2C:
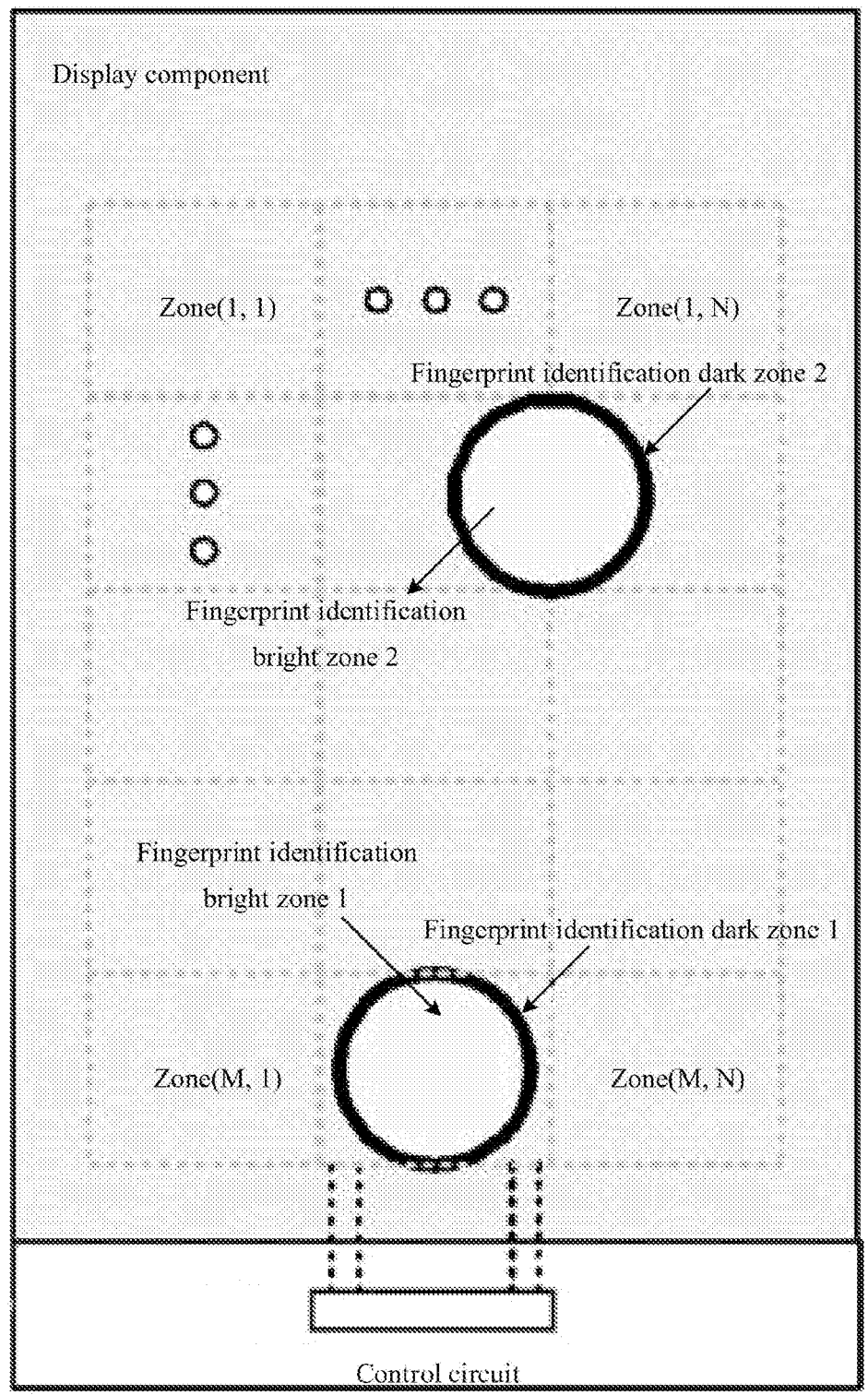

FIG. 2C is a front view illustrating an electronic product in which a fingerprint identification dark zone is located around a fingerprint identification bright zone according to the embodiments of the present disclosure. For the electronic product shown in FIG. 2C, the display component and the fingerprint identification apparatus (including the control circuit and the array of optical sensing elements) thereof may be arranged in the manner shown in FIG. 2A.

The structure of the electronic product shown in FIG. 2C is similar to that of the electronic product shown in FIG. 2B, their difference is that after detecting the touch signal of the finger to be identified, the fingerprint identification apparatus determines the touch zone of the finger to be identified based on the touch signal, and dynamically determines the fingerprint identification bright zone and the fingerprint identification dark zone on the display component based on the touch zone, wherein the fingerprint identification dark zone is close to and at least partially surrounds the fingerprint identification bright zone. That is, in the scheme of FIG. 2C, the position of the fingerprint identification dark zone changes with the position of the touch zone. The touch zone covers at least part of the fingerprint identification bright zone and at least part of the fingerprint identification dark zone.

There are many ways to determine the fingerprint identification bright zone and the fingerprint identification dark zone.

For example, the control circuit may first determine a center of the touch zone, thereafter determine the fingerprint identification bright zone by taking the center of the touch zone as an origin, and take a plurality of rows or columns of display pixels adjacent to a part of display pixels at the outermost periphery of the fingerprint identification bright zone as the fingerprint identification dark zone, wherein an area of the fingerprint identification bright zone is a preset area (e.g., the average area of contact zones of the fingers to be identified), or an area of the fingerprint identification bright zone is determined according to an area of the touch zone and is greater than or equal to a first area threshold (e.g., the average area of contact zones of the baby fingers).

Another example, the control circuit may first determine an edge zone of the touch zone, thereafter determines at least part of the edge zone as the fingerprint identification dark zone, and then determine the fingerprint identification bright zone based on the fingerprint identification dark zone and the touch zone. Similarly, an area of the fingerprint identification bright zone may be a preset area, or an area of the fingerprint identification bright zone may be determined according to an area of the touch zone and is greater than or equal to the first area threshold.

It should be understood the term "area" in present disclosure may include coverage area of the touch zone and may also include shape of the touch zone.

For the example shown in FIG. 2C, the control circuit may be configured to: acquire a touch signal of a finger to be identified on the display component, determine a touch zone of the finger to be identified based on the touch signal, and provide a light emission control signal to the display component based on the determined touch zone, wherein the light emission control signal is used to control the display component to form a fingerprint identification bright zone and a fingerprint identification dark zone, wherein the fingerprint identification dark zone is close to and at least partially surrounds the fingerprint identification bright zone. In addition, the control circuit may also be configured to: acquire a bright zone fingerprint detection signal corresponding to a fingerprint identification bright zone, and perform a fingerprint identification of the finger to be identified based on the bright zone fingerprint detection signal; or, the control circuit may be further configured to: acquire a bright zone fingerprint detection signal corresponding to a fingerprint identification bright zone and a dark zone fingerprint detection signal corresponding to a fingerprint identification dark zone, and perform a fingerprint identification of the finger to be identified based on the bright zone fingerprint detection signal and the dark zone fingerprint detection signal. It should be noted that, for the example shown in FIG. 2C, the fingerprint identification dark zone is close to the fingerprint identification bright zone, the dark zone fingerprint detection signal and the bright zone fingerprint detection signal both contain the fingerprint information of the finger to be identified.

During fingerprint identification, display pixels in the fingerprint identification bright zone are controlled to emit light, and display pixels in the fingerprint identification dark zone are controlled to not emit light, or, during fingerprint identification, brightness of display pixels in the fingerprint identification bright zone is controlled to be higher than that of display pixels in the fingerprint identification dark zone. According to the embodiments of the present disclosure, brightness of the fingerprint identification bright zone may be higher than brightness at which the display component displays an image, and brightness of the fingerprint identification dark zone may be lower than brightness at which the display component displays an image.

For the example shown in FIG. 2C, each optical sensing unit in the array of optical sensing units is used to receive light reflected by the finger to be identified and convert an optical signal into an electrical signal; wherein the bright zone fingerprint detection signal is an electrical signal generated by optical sensing units corresponding to the fingerprint identification bright zone, and the dark zone fingerprint detection signal is an electrical signal generated by optical sensing units corresponding to the fingerprint identification dark zone.

Optionally, in a case where the display component includes a plurality of display sub-zones (as shown in the zone (1, 1) to zone (M, N) in FIG. 2C), the fingerprint identification bright zone may be associated with one display sub-zone (e.g., as shown in the fingerprint identification bright zone 1 in FIG. 2C), and may also be associated with a plurality of display sub-zones (e.g., as shown in the fingerprint identification bright zone 2 in FIG. 2C). In a case where the touch zone is associated with one display sub-zone, the touch zone in the one display sub-zone may be configured as a fingerprint identification bright zone; in a case where the touch zone is associated with a plurality of display sub-zones, the touch zones in the plurality of display sub-zones may be combined to form the fingerprint identification bright zone.

Similarly, the fingerprint identification dark zone may be associated with one display sub-zone (e.g., as shown in the fingerprint identification dark zone 1 in FIG. 2C), and may also be associated with a plurality of display sub-zones (e.g., as shown in the fingerprint identification dark zone 2 in FIG. 2C). In a case where the touch zone is associated with one display sub-zone, the zone close to and at least partially surrounding the fingerprint identification bright zone in the plurality of display sub-zones may be configured as a fingerprint identification dark zone; in a case where the touch zone is associated with a plurality of display sub-zones, the zones close to and at least partially surrounding the fingerprint identification bright zone in the plurality of display sub-zones may be combined to form the fingerprint identification dark zone.

It should be understood that, although the fingerprint identification dark zone is depicted as completely surrounding the fingerprint identification bright zone in FIG. 2C, the embodiments of the present disclosure are not limited thereto, and the fingerprint identification dark zone may not completely surround the fingerprint identification bright zone so long as it is close to and at least partially surrounds the fingerprint identification bright zone.

For the example of FIG. 2C, since both the dark zone fingerprint detection signal and the bright zone fingerprint detection signal contain the fingerprint information of the finger to be identified, the fingerprint identification apparatus can obtain two different types of fingerprint information concurrently, so the fingerprint identification apparatus in FIG. 2C can also perform a true/false finger detection of the finger to be identified based on the bright zone fingerprint detection signal and the dark zone fingerprint detection signal. Specifically, the bright zone fingerprint detection signal includes a first bright zone fingerprint detection signal corresponding to a convex part of the fingerprint and a second bright zone fingerprint detection signal corresponding to a concave part of the fingerprint, and the dark zone fingerprint detection signal includes a first dark zone fingerprint detection signal corresponding to a convex part of the fingerprint and a second dark zone fingerprint detection signal corresponding to a concave part of the fingerprint; the control circuit may perform a true/false finger detection of the finger to be identified based on a first difference between the first bright zone fingerprint detection signal and the second bright zone fingerprint detection signal corresponding to the fingerprint identification bright zone, and a second difference between the first dark zone fingerprint detection signal and the second dark zone fingerprint detection signal corresponding to the fingerprint identification dark zone.

Since the fingerprint identification method of the present disclosure directly utilizes the fingerprint sensor under the display component and controls the transistor of the display component, and adds no new module to the electronic product, it therefore has the advantages of good compatibility, small volume, and wide application scenarios and so on.

Figure 3A:
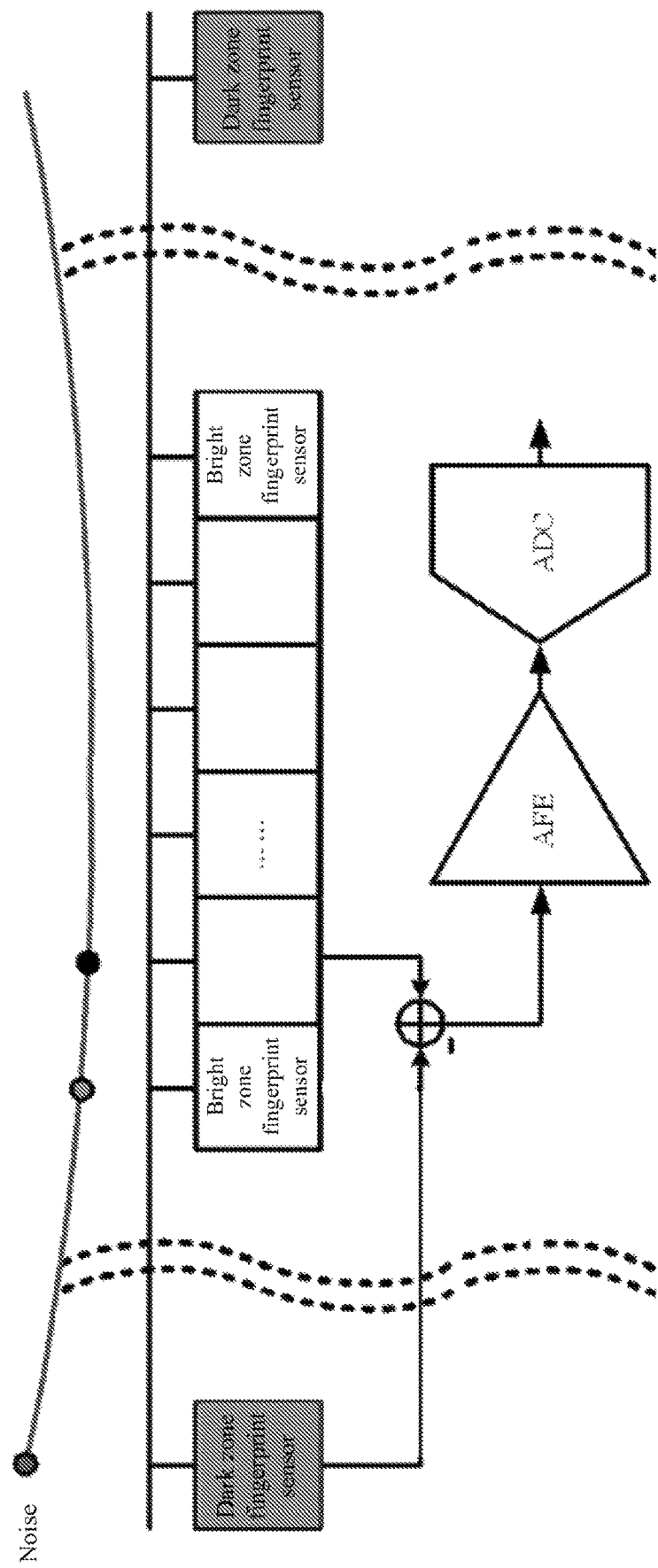
FIGS. 3A to 3C are schematic diagrams illustrating a fingerprint detection signal processing procedure according to the embodiments of the present disclosure.

FIG. 3A is a schematic diagram illustrating a fingerprint detection signal processing procedure for the electronic product shown in FIG. 2B according to the embodiments of the present disclosure.

Generally, the fingerprint identification apparatus can directly perform the fingerprint identification of the finger to be identified based on a bright zone fingerprint detection signal. However, in this processing manner, the fingerprint identification process is easy to be affected by noise, and the result of fingerprint identification is inaccurate.

Preferably, as shown in FIG. 3A, the fingerprint identification of the finger to be identified may be performed based on a difference between the bright zone fingerprint detection signal and the dark zone fingerprint detection signal.

As can be seen from FIG. 3A, the magnitude of noise may be related to the position on the display component. By obtaining a difference between the bright zone fingerprint detection signal (the signal obtained from the bright zone fingerprint sensor shown in the white blocks in FIG. 3A) and the dark zone fingerprint detection signal (the signal obtained from the dark zone fingerprint sensor shown in the gray blocks in FIG. 3A), and then providing the difference to the analog front end (AFE) and/or the analog-digital converter (ADC) for processing, so as to further perform the fingerprint identification of the finger to be identified, the noise interference can be effectively reduced and the accuracy of fingerprint identification can be improved. Generally, in order to make the correlation between the bright zone fingerprint detection signal and the dark zone fingerprint detection signal higher, the fingerprint identification of the finger to be identified is usually performed by obtaining a difference between the bright zone fingerprint detection signal of the bright zone fingerprint sensor and the dark zone fingerprint detection signal of the dark zone fingerprint sensor located in the same row.

Figure 3B:
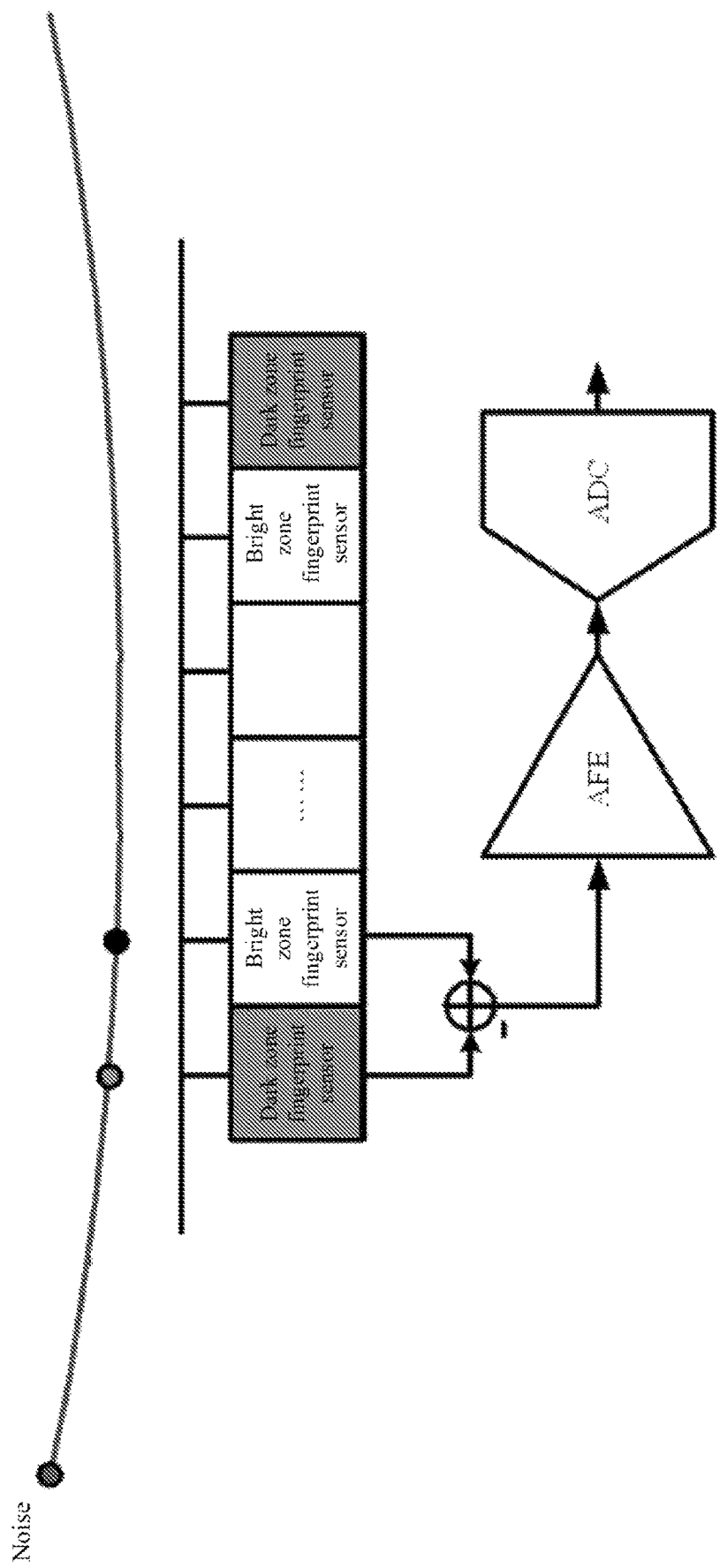
Figure 3C:
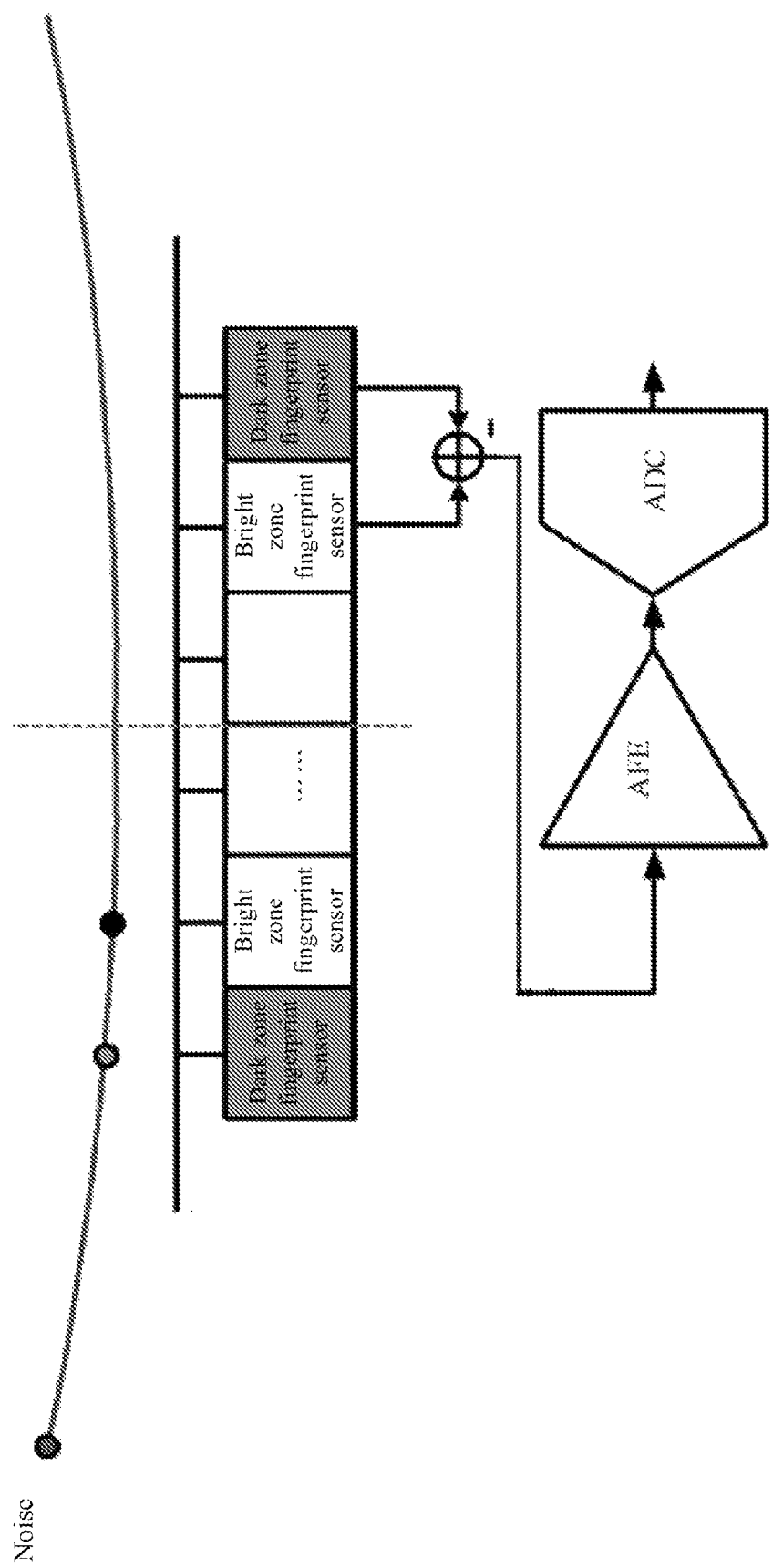

FIGS. 3B to 3C are schematic diagrams illustrating the fingerprint detection signal processing procedure for the electronic product shown in FIG. 2C according to the embodiments of the present disclosure.

As shown in FIG. 3B, the difference between the bright zone fingerprint detection signal (the signal obtained from the bright zone fingerprint sensor shown in the white blocks in FIG. 3B) and the dark zone fingerprint detection signal (the signal obtained from the dark zone fingerprint sensor shown in the gray blocks in FIG. 3B) may be obtained, and then the difference is provided to the analog front end (AFE) and/or analog-digital converter (ADC) for processing, so as to further perform a fingerprint identification of the finger to be identified.

For the electronic product of FIG. 2B, the fingerprint identification dark zone is located at the edge of the display component, and its position does not change with the position of the touch zone; while for the electronic product of FIG. 2C, the fingerprint identification dark zone is close to and at least partially surrounds the fingerprint identification bright zone, and its position changes with the position of the touch zone. Therefore, the correlation between the bright zone fingerprint detection signal and the dark zone fingerprint detection signal in the scheme of FIG. 2C is higher as compared with that in the scheme of FIG. 2B. Under the processing mode of performing the fingerprint identification of the finger to be identified based on the difference between the bright zone fingerprint detection signal and the dark zone fingerprint detection signal, the scheme of FIG. 2C has better noise reduction effect and higher accuracy of fingerprint identification.

Optionally, noise suppression may only be related to part of the fingerprint bright zone and the part of the fingerprint dark zone. For example, the fingerprint bright zone and the fingerprint dark zone may be each divided into a left part and a right part, and then the fingerprint identification of the finger to be identified may be performed based on the difference between the left bright zone fingerprint detection signal and the left dark zone fingerprint detection signal (e.g. as shown in FIG. 3B); the fingerprint identification of the finger to be identified may be performed based on the difference between the right bright zone fingerprint detection signal and the right dark zone fingerprint detection signal (e.g., as shown in FIG. 3C). Similarly, the fingerprint bright zone and the fingerprint dark zone may be each divided into an upper part and a lower part, and then the fingerprint identification of the finger to be identified may be performed by using the fingerprint bright zone part and the fingerprint dark zone part, and so on. The specific division manner is not limited to equal division, there may be a variety of manners.

Optionally, the fingerprint identification of the finger to be identified may be further performed based on a difference between a single fingerprint detection signal of the fingerprint identification bright zone and a single fingerprint detection signal of the fingerprint identification dark zone; or, the fingerprint identification of the finger to be identified may be performed based on a difference between a single fingerprint detection signal of the fingerprint identification bright zone and an average of a plurality of fingerprint detection signals of the fingerprint identification dark zone; or, the fingerprint identification of the finger to be identified may be performed based on a difference between an average of a plurality of fingerprint detection signals of the fingerprint identification bright zone and an average of a plurality of fingerprint detection signals of the fingerprint identification dark zone. It should be noted that the average herein may be arithmetic average, a weighted average, etc.

It should be understood that, according to the embodiments of the present disclosure, in the examples of FIGS. 3A to 3C, the fingerprint identification of the finger to be identified is performed based on the difference between the bright zone fingerprint detection signal and the dark zone fingerprint detection signal as an example, but not as a limitation. In fact, the fingerprint identification of the finger to be identified may also be performed based on a function related to the bright zone fingerprint detection signal and the dark zone fingerprint detection signal.

Figure 4A:
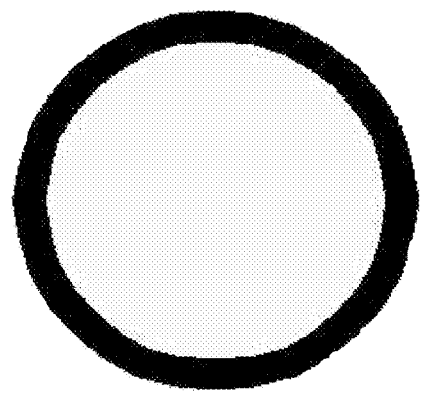
FIGS. 4A to 4B are schematic diagrams illustrating a fingerprint identification bright zone and a fingerprint identification dark zone according to the embodiments of the present disclosure.
Figure 4B:
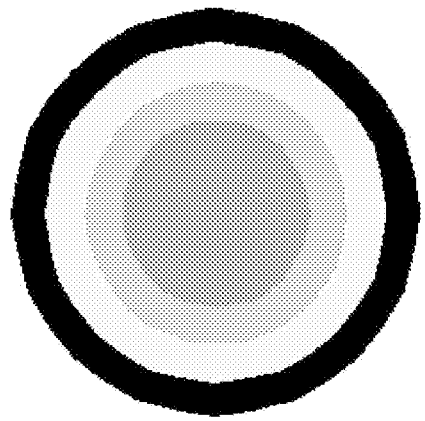

In addition, there may be many forms of light in the fingerprint identification bright zone. For example, FIG. 4A is a schematic diagram illustrating a fingerprint identification bright zone and a fingerprint identification dark zone in a case where the fingerprint identification bright zone is a light spot with uniform light intensity according to the embodiments of the present disclosure. FIG. 4B is a schematic diagram illustrating a fingerprint identification bright zone and a fingerprint identification dark zone in a case where the fingerprint identification bright zone is a light spot with non-uniform light intensity according to the embodiments of the present disclosure. In order to make the correlation between the bright zone fingerprint detection signal and the dark zone fingerprint detection signal high, the fingerprint identification of the finger to be identified may be further performed based on the difference between the fingerprint detection signal in the fingerprint identification bright zone and the fingerprint detection signal in the fingerprint identification dark zone from adjacent or close fingerprint sensors.

Figure 5:
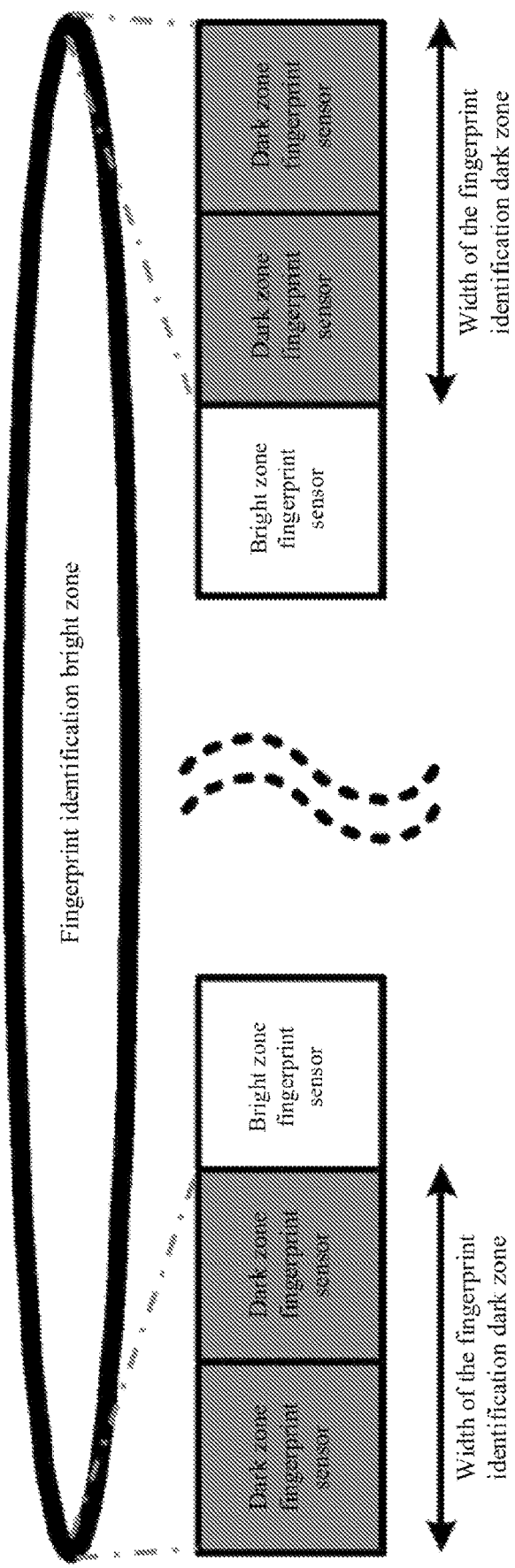
FIG. 5 is a schematic diagram illustrating details of a fingerprint identification zone according to the embodiments of the present disclosure.

Further, FIG. 5 is a schematic diagram illustrating the details of the fingerprint identification zone of the electronic product shown in FIG. 2C according to the embodiments of the present disclosure.

According to the embodiments of the present disclosure, the fingerprint identification bright zone may be a circular zone, an elliptical zone, or a rectangular zone, etc., and the fingerprint identification dark zone includes a plurality of rows or columns of display pixels adjacent to a part of display pixels at the outermost periphery of the fingerprint identification bright zone. The fingerprint identification bright zone and the fingerprint identification dark zone both correspond to a plurality of fingerprint sensors, the plurality of fingerprint sensors may be distributed in an array.

In addition, the display component may include a plurality of thin film transistor (TFT) pixels, and the plurality of TFT pixels and the plurality of fingerprint sensors may be distributed in an interlaced manner. For example, the plurality of TFTs and the plurality of fingerprint sensors may be located on the same plane and interlaced in array, or the plurality of TFTs and the plurality of fingerprint sensors may be located on two different planes and interlaced in array.

According to the embodiments of the present disclosure, the width of the fingerprint identification dark zone may be set to be not less than 100 microns, so as to reduce the influence of stray light on the measurement result of the sensor in the fingerprint identification dark zone.

Figure 6A:
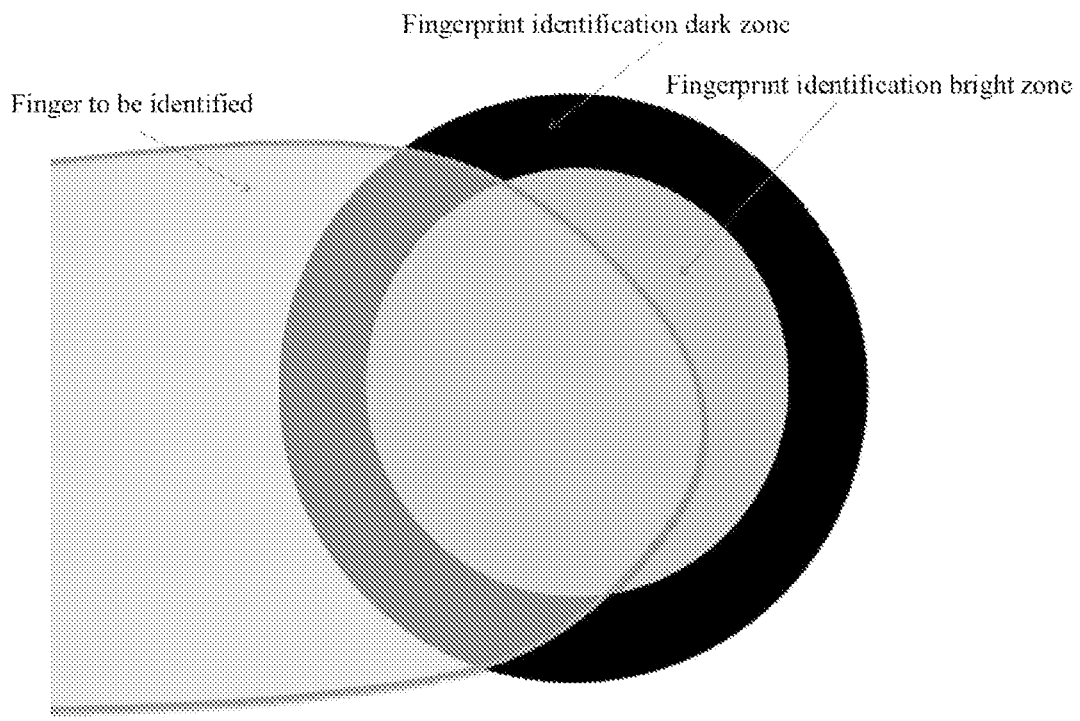
FIGS. 6A to 6B are schematic diagrams illustrating scenarios in which a fingerprint identification bright zone and a fingerprint identification dark zone are determined based on a touch zone according to the embodiments of the present disclosure.
Figure 6B:
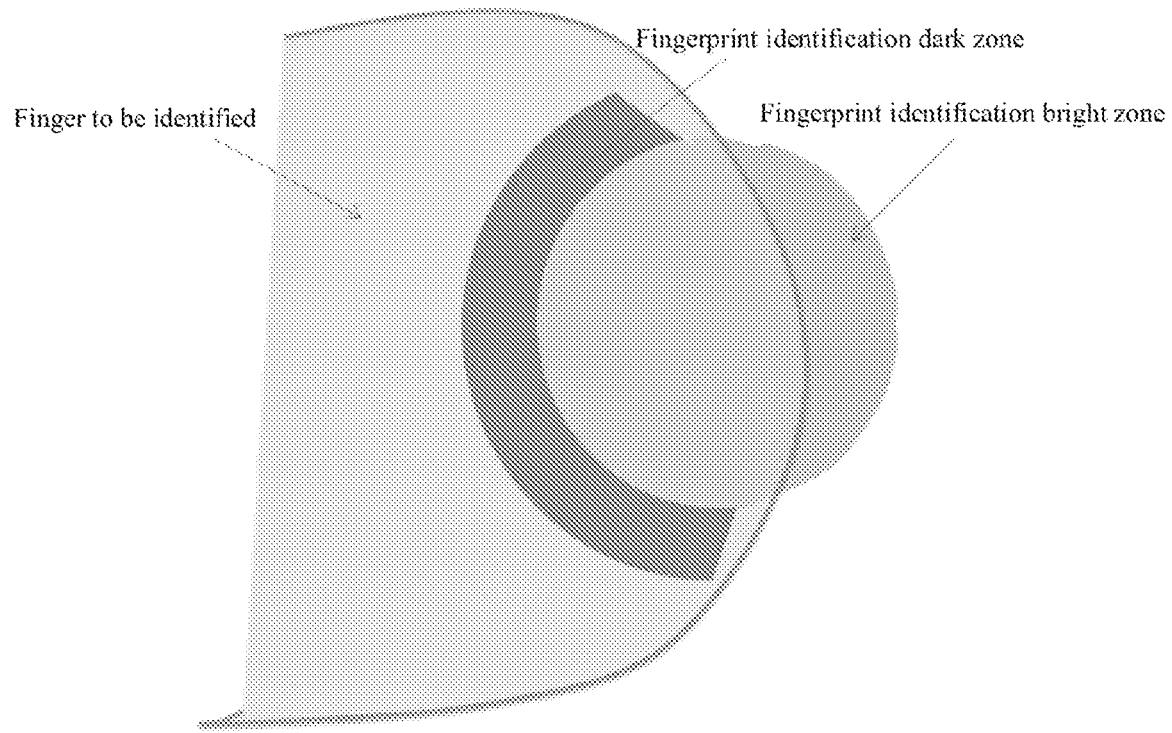

FIGS. 6A to 6B are schematic diagrams illustrating scenarios in which a fingerprint identification bright zone and a fingerprint identification dark zone are determined based on a touch zone according to the embodiments of the present disclosure.

As shown in FIG. 6A, the fingerprint identification bright zone may be a circular zone, and the fingerprint identification dark zone may be an annular zone close to and surrounding the fingerprint identification bright zone. As can be seen from FIG. 6A, when the finger to be identified touches from one side of the display component, only the bright zone fingerprint detection signal of the fingerprint identification bright zone and the dark zone fingerprint detection signal of the fingerprint identification dark zone below the finger to be identified actually contain useful fingerprint information. Therefore, as shown in FIG. 6B, the fingerprint identification dark zone may also be an arc zone close to and at least partially surrounding the fingerprint identification bright zone.

Specifically, according to the embodiments of the present disclosure, the process of determining the fingerprint identification bright zone and the fingerprint identification dark zone on the display component based on the touch zone may be realized in the following ways: determining a center of the touch zone; thereafter determining the fingerprint identification bright zone by taking the center of the touch zone as an origin; next, taking a plurality of rows or columns of display pixels adjacent to a part of display pixels at the outermost periphery of the fingerprint identification bright zone as the fingerprint identification dark zone, wherein an area of the fingerprint identification bright zone is a preset area, or an area of the fingerprint identification bright zone is determined according to an area of the touch zone and is greater than or equal to a first area threshold.

According to the embodiments of the present disclosure, the procedure of determining a fingerprint identification bright zone and a fingerprint identification dark zone on the display component based on the touch zone may be further realized in the following ways: first, determining an edge zone of the touch zone; thereafter, determining at least part of the edge zone as the fingerprint identification dark zone; next, determining the fingerprint identification bright zone based on the fingerprint identification dark zone and the touch zone.

According to the embodiments of the present disclosure, an area of the touch zone may be determined first; thereafter, the edge zone of the touch zone is determined based on the touch zone in a case where the area of the touch zone is smaller than a second area threshold; next, at least part of the edge zone is determined as the fingerprint identification dark zone; finally, the fingerprint identification bright zone is determined based on the fingerprint identification dark zone and the touch zone.

Figure 7:
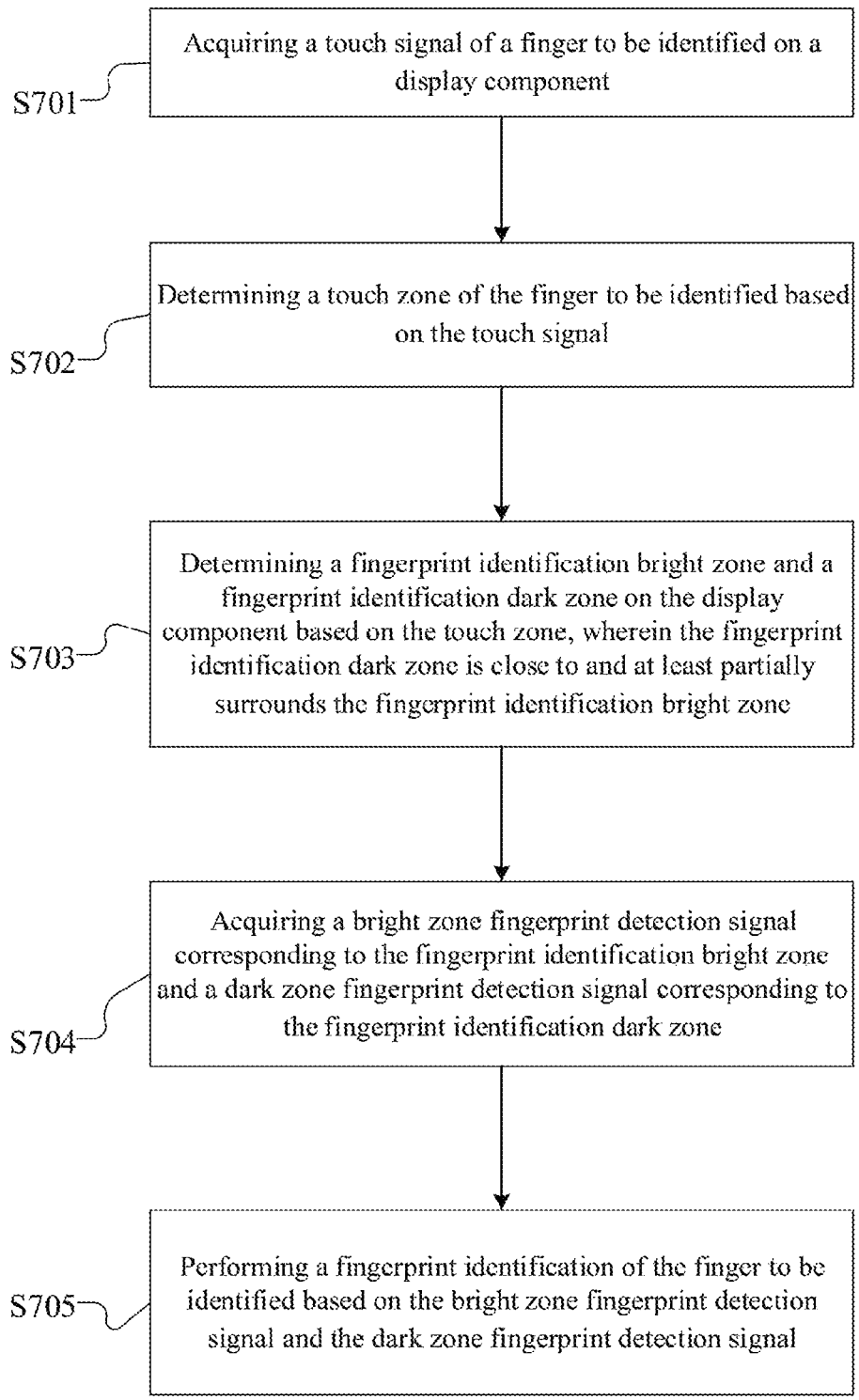
FIG. 7 is a schematic flowchart illustrating a fingerprint identification method according to the embodiments of the present disclosure.

FIG. 7 is a schematic flowchart 700 illustrating a fingerprint identification method according to the embodiments of the present disclosure.

In step S701, a touch signal of a finger to be identified on a display component is acquired.

It should be understood that, the acquisition of the touch signal of the finger to be identified may be realized by various types of touch sensing techniques. For example, using a touch sensing sensor located below the display component or using a touch sensing sensor integrated with the display component etc.

In step S702, a touch zone of the finger to be identified is determined based on the touch signal.

Optimally, when the display component includes a plurality of display sub-zones, the touch zone of the finger to be identified may be associated with at least one display sub-zone of the plurality of display sub-zone.

In step S703, a fingerprint identification bright zone and a fingerprint identification dark zone on the display component are determined based on the touch zone, wherein the fingerprint identification dark zone is close to and at least partially surrounds the fingerprint identification bright zone.

In the embodiments of the present disclosure, the fingerprint identification bright zone may be a circular zone, an elliptical zone or a rectangular zone etc. corresponding to the touch zone, and the fingerprint identification dark zone may include a plurality of rows or columns of display pixels adjacent to a part of display pixels at the outermost periphery of the fingerprint identification bright zone, wherein during fingerprint identification, display pixels in the fingerprint identification bright zone are controlled to emit light, and display pixels in the fingerprint identification dark zone are controlled to not emit light, or, during fingerprint identification, brightness of display pixels in the fingerprint identification bright zone is controlled to be higher than that of display pixels in the fingerprint identification dark zone.

According to the embodiments of the present disclosure, the display component may further include a plurality of display sub-zones, each display sub-zone includes a plurality of display pixels, the fingerprint identification bright zone is associated with at least one display sub-zone of the plurality of display sub-zones, and the fingerprint identification dark zone is associated with at least one display sub-zone of the plurality of display sub-zones.

According to the embodiments of the present disclosure, there may be many ways to determine a fingerprint identification bright zone and a fingerprint identification dark zone on the display component based on the touch zone.

For example, a center of the touch zone may be determined; thereafter, the fingerprint identification bright zone is determined by taking the center of the touch zone as an origin; and a plurality of rows or columns of display pixels adjacent to a part of display pixels at the outermost periphery of the fingerprint identification bright zone are taken as the fingerprint identification dark zone, wherein an area of the fingerprint identification bright zone is a preset area, or an area of the fingerprint identification bright zone is determined according to an area of the touch zone and is greater than or equal to a first area threshold; wherein the touch zone covers at least part of the fingerprint identification bright zone and at least part of the fingerprint identification dark zone.

Optionally, also, an edge zone of the touch zone may be determined; thereafter, at least part of the edge zone is determined as the fingerprint identification dark zone; and the fingerprint identification bright zone is determined based on the fingerprint identification dark zone and the touch zone, wherein the touch zone covers at least part of the fingerprint identification bright zone and at least part of the fingerprint identification dark zone.

Optionally, an area of the touch zone may be determined; wherein the edge zone of the touch zone is determined based on the touch zone in a case where the area of the touch zone is smaller than a second area threshold, thereafter at least part of the edge zone is determined as the fingerprint identification dark zone.

In step S704, a bright zone fingerprint detection signal corresponding to the fingerprint identification bright zone and a dark zone fingerprint detection signal corresponding to the fingerprint identification dark zone are acquired.

It should be understood that the sensor for acquiring the fingerprint detection signal in step S704 may be the same as or different from the touch sensor in step S701. Optionally, AFE modules such as a filter module and a signal amplifier module may be used to process the fingerprint detection signals.

In step S705, the fingerprint identification of the finger to be identified is performed based on the bright zone fingerprint detection signal and the dark zone fingerprint detection signal.

According to the embodiments of the present disclosure, the fingerprint identification of the finger to be identified may be performed based on a difference between the bright zone fingerprint detection signal and the dark zone fingerprint detection signal, so as to improve the accuracy of under-screen fingerprint identification.

Optionally, the fingerprint identification of the finger to be identified may be performed based on a difference between a single fingerprint detection signal of the fingerprint identification bright zone and a single fingerprint detection signal of the fingerprint identification dark zone; or, the fingerprint identification of the finger to be identified may be performed based on a difference between a single fingerprint detection signal of the fingerprint identification bright zone and an average of a plurality of fingerprint detection signals of the fingerprint identification dark zone; or, the fingerprint identification of the finger to be identified may be performed based on a difference between an average of a plurality of fingerprint detection signals of the fingerprint identification bright zone and an average of a plurality of fingerprint detection signals of the fingerprint identification dark zone, wherein the average may be an arithmetic average or a weighted average.

According to the embodiments of the present disclosure, a true/false finger detection of the finger to be identified may be performed based on both the bright zone fingerprint detection signal and the dark zone fingerprint detection signal, so as to improve the efficiency of true/false finger detection.

Optionally, the bright zone fingerprint detection signal may include a first bright zone fingerprint detection signal corresponding to a convex part of the fingerprint and a second bright zone fingerprint detection signal corresponding to a concave part of the fingerprint, and the dark zone fingerprint detection signal may include a first dark zone fingerprint detection signal corresponding to a convex part of the fingerprint and a second dark zone fingerprint detection signal corresponding to a concave part of the fingerprint. Thus, a true/false finger detection of the finger to be identified may be performed based on a first difference between the first bright zone fingerprint detection signal and the second bright zone fingerprint detection signal corresponding to the fingerprint identification bright zone, and a second difference between the first dark zone fingerprint detection signal and the second dark zone fingerprint detection signal corresponding to the fingerprint identification dark zone.

Optionally, in a case where the first difference is greater than the second difference, the finger to be identified may be determined as a true finger. Optionally, in a case where a ratio of the first difference to the second difference is greater than 1, the finger to be identified may also be determined as a true finger.

For example, the bright zone fingerprint detection signal may include a first bright zone fingerprint detection signal $V_{bright}^{peak}$ corresponding to a convex part of the fingerprint and a second bright zone fingerprint detection signal $V_{bright}^{trough}$ corresponding to a concave part of the fingerprint, and the dark zone fingerprint detection signal includes a first dark zone fingerprint detection signal $V_{dim}^{peak}$ corresponding to a convex part of the fingerprint and a second dark zone fingerprint detection signal $V_{dim}^{trough}$ corresponding to a concave part of the fingerprint. In a case where $(V_{bright}^{peak} - V_{bright}^{trough}) > (V_{dim}^{peak} - V_{dim}^{trough})$, the finger to be identified may also be determined as a true finger.

Optionally, in a case where a difference between the first difference $(V_{bright}^{peak} - V_{bright}^{trough})$ and the second difference $(V_{dim}^{peak} - V_{dim}^{trough})$ is greater than a first threshold, the finger to be identified may also be determined as a true finger. Or, in a case where a ratio between the first difference $(V_{bright}^{peak} - V_{bright}^{trough})$ and the second difference $(V_{dim}^{peak} - V_{dim}^{trough})$ is greater than a second threshold, the finger to be identified may also be determined as a true finger. Or, in a case where a ratio of a difference between the first difference $(V_{bright}^{peak} - V_{bright}^{trough})$ and the second difference $(V_{dim}^{peak} - V_{dim}^{trough})$ to the first difference $(V_{bright}^{peak} - V_{bright}^{trough})$ or the second difference $(V_{dim}^{peak} - V_{dim}^{trough})$ is greater than a third threshold, the finger to be identified may also be determined as a true finger.

Optionally, the first bright zone fingerprint detection signal, the second bright zone fingerprint detection signal, the first dark zone fingerprint detection signal and the second dark zone fingerprint detection signal may be acquired by detecting light with a specific wavelength (e.g., the monochromatic light such as red light and blue light). In addition, the first bright zone fingerprint detection signal, the second bright zone fingerprint detection signal, the first dark zone fingerprint detection signal, and the second dark zone fingerprint detection signal may be acquired by detecting various types of light (e.g. polychromatic light such as white light etc., or light in a specific wavelength range).

In the traditional process of true/false finger detection, it is usually necessary to scan the finger to be identified several times with different light, or scan the finger to be identified several times at different positions to realize the detection of true/false finger. In the present disclosure, because the fingerprint identification bright zone and the fingerprint identification dark zone corresponding to the touch zone are effectively utilized, the fingerprint identification method of the present disclosure can realize the detection of true/false finger by only one time of fingerprint scan, which improves the efficiency of true/false finger detection and improves the user experience. In addition, the fingerprint identification method of the present disclosure can realize the accurate identification of fingerprint and the detection of true/false finger by only one time of fingerprint scan, thereby effectively improves the existing fingerprint identification mode.

Figure 8:
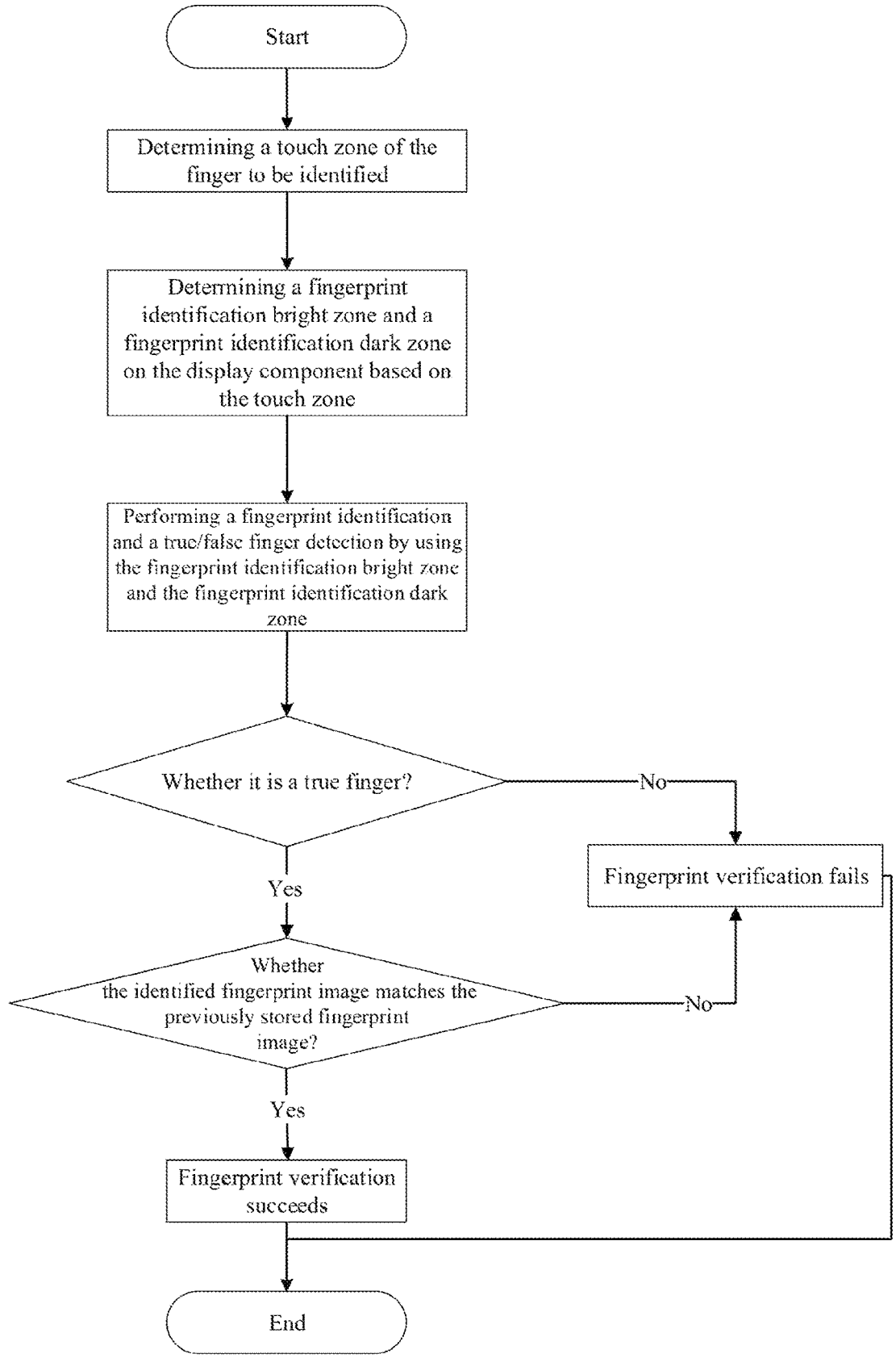
FIG. 8 is a schematic flowchart illustrating a fingerprint verification process according to the embodiments of the present disclosure.

FIG. 8 is a schematic flowchart illustrating a fingerprint verification process according to the embodiments of the present disclosure.

As shown in FIG. 8, in the process of fingerprint verification, the electronic product can determine a touch zone of the finger to be identified by the fingerprint identification apparatus, then determine a fingerprint identification bright zone and a fingerprint identification dark zone on the display component based on the touch zone, and then use the fingerprint identification bright zone and the fingerprint identification dark zone to perform a fingerprint identification and a true/false finger detection.

For example, the fingerprint identification apparatus can perform the fingerprint identification of the finger to be identified based on the difference between the bright zone fingerprint detection signal and the dark zone fingerprint detection signal, so as to reduce the interference during fingerprint identification and improve the accuracy of under-screen fingerprint identification. Meanwhile, the fingerprint identification apparatus can use the first bright zone fingerprint detection signal corresponding to the convex part of the fingerprint, the second bright zone fingerprint detection signal corresponding to the concave part of the fingerprint, the first dark zone fingerprint detection signal corresponding to the convex part of the fingerprint and the second dark zone fingerprint detection signal corresponding to the concave part of the fingerprint to realize the true/false finger detection of the finger to be identified. Since the fingerprint identification and the true/false finger detection can be realized by scanning the finger to be identified for only once, the efficiency of fingerprint signal processing has been significantly improved.

In a case where the finger to be identified is determined as not a true finger, the electronic product can determine that the fingerprint verification fails, and then prevent the user from operations of the electronic product, such as unlocking, logging in, performing fingerprint payment etc.

In a case where the finger to be identified is determined as a true finger, whether the identified fingerprint image matches the previously stored fingerprint image may be further determined to verify the user's identity. It should be understood that the procedure of determining whether the identified fingerprint image matches the previously stored fingerprint image may be directly processed by the electronic product, or the identified fingerprint image may be sent by the electronic product to a network server and then processed by the network server, and the network server returns the result of determination to the electronic product.

Then in a case where it is determined that the identified fingerprint image is not matching the previously stored fingerprint image, the electronic product may determine that the fingerprint verification fails, and then prevent the user from operating the electronic product, such as unlocking, logging in, performing fingerprint payment etc.

In a case where it is determined that the identified fingerprint image matches the previously stored fingerprint image, the electronic product can determine that the fingerprint verification succeeds, and then allow the user to unlock, log in, and perform fingerprint payment and other operations on the electronic product.

Therefore, the present disclosure provides a fingerprint identification method and apparatus, and an electronic product including the fingerprint identification apparatus.

According to the embodiments of the present disclosure, the fingerprint identification method includes: acquiring a touch signal of a finger to be identified on a display component; determining a touch zone of the finger to be identified based on the touch signal; determining a fingerprint identification bright zone and a fingerprint identification dark zone on the display component based on the touch zone, wherein the fingerprint identification dark zone is close to and at least partially surrounds the fingerprint identification bright zone; acquiring a bright zone fingerprint detection signal corresponding to the fingerprint identification bright zone and a dark zone fingerprint detection signal corresponding to the fingerprint identification dark zone; and performing a fingerprint identification of the finger to be identified based on the bright zone fingerprint detection signal and the dark zone fingerprint detection signal.

The interference during under-screen fingerprint identification can be effectively reduced and the accuracy of under-screen fingerprint identification can be improved through the fingerprint identification method of the present disclosure. Meanwhile, the fingerprint identification method of the present disclosure can realize the detection of a true/false finger by only one time of fingerprint scan, thereby improves the efficiency of true/false finger detection. In addition, the fingerprint identification method of the present disclosure does not make too many changes to the hardware of the electronic product, and has the advantages of good compatibility, small size, and wide application scenarios.

The present disclosure uses specific words to describe the embodiments of the present disclosure. Examples such as "first/second embodiment", "one embodiment" and/or "some embodiments" refer to a certain feature, structure or characteristic related to at least one embodiment of the present disclosure. Therefore, it should be emphasized and noted that "an embodiment" or "one embodiment" or "an alternative embodiment" mentioned twice or more in different places in this specification do not necessarily mean the same embodiment. In addition, some features, structures, or characteristics in one or more embodiments of the present disclosure may be appropriately combined.

Unless otherwise defined, all terms (including technical and scientific terms) used herein have the same meaning as commonly understood by those of ordinary skill in the art to which this disclosure belongs. It will be further understood that terms, such as those defined in commonly used dictionaries, should be interpreted as having the meaning that is consistent with their meaning in the context of the relevant art and will not be interpreted in an idealized or overly formal sense unless explicitly defined herein.

The above is illustration of the present disclosure and should not be construed as making limitation thereto. Although some exemplary embodiments of the present disclosure have been described, those skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the embodiments of the present disclosure and other embodiments are intended to be included in the scope of the attached claims. The present disclosure is defined by the claims and their equivalents.

What is claimed is:

1. A fingerprint identification apparatus used to be arranged below a display component, comprising:
   a control circuit configured to acquire a touch signal of a finger to be identified on the display component, determine a touch zone of the finger to be identified based on the touch signal, and provide a light emission control signal to the display component based on the determined touch zone, the light emission control signal is used to control the display component to form a fingerprint identification bright zone and a fingerprint identification dark zone, wherein the fingerprint identification dark zone is close to and at least partially surrounds the fingerprint identification bright zone;

the control circuit is further configured to acquire a bright zone fingerprint detection signal corresponding to the fingerprint identification bright zone and a dark zone fingerprint detection signal corresponding to the fingerprint identification dark zone, and perform a fingerprint identification of the finger to be identified based on the bright zone fingerprint detection signal and the dark zone fingerprint detection signal.

2. The fingerprint identification apparatus according to claim 1, further comprising:

an array of optical sensing units, wherein each optical sensing unit is used to receive light reflected by the finger to be identified and convert an optical signal into an electrical signal;

wherein the bright zone fingerprint detection signal is an electrical signal generated by optical sensing units corresponding to the fingerprint identification bright zone, and the dark zone fingerprint detection signal is an electrical signal generated by optical sensing units corresponding to the fingerprint identification dark zone.

3. The fingerprint identification apparatus according to claim 1, wherein the control circuit is further configured to perform a true/false finger detection of the finger to be identified based on the bright zone fingerprint detection signal and the dark zone fingerprint detection signal.

4. The fingerprint identification apparatus according to claim 1, wherein the control circuit performs the fingerprint identification of the finger to be identified based on a difference between the bright zone fingerprint detection signal and the dark zone fingerprint detection signal.

5. The fingerprint identification apparatus according to claim 3, wherein the bright zone fingerprint detection signal includes a first bright zone fingerprint detection signal corresponding to a convex part of the fingerprint and a second bright zone fingerprint detection signal corresponding to a concave part of the fingerprint, and the dark zone fingerprint detection signal includes a first dark zone fingerprint detection signal corresponding to a convex part of the fingerprint and a second dark zone fingerprint detection signal corresponding to a concave part of the fingerprint, wherein the control circuit performs the true/false finger detection of the finger to be identified based on a first difference between the first bright zone fingerprint detection signal and the second bright zone fingerprint detection signal corresponding to the fingerprint identification bright zone, and a second difference between the first dark zone fingerprint detection signal and the second dark zone fingerprint detection signal corresponding to the fingerprint identification dark zone.

6. The fingerprint identification apparatus according to claim 1, wherein the fingerprint identification bright zone is a circular zone, an elliptical zone or a rectangular zone, and the fingerprint identification dark zone includes a plurality of rows or columns of display pixels adjacent to a part of display pixels at the outermost periphery of the fingerprint identification bright zone, and a width of the fingerprint identification dark zone is not less than 100 microns, wherein during fingerprint identification, display pixels in the fingerprint identification bright zone are controlled to emit light, and display pixels in the fingerprint identification dark zone are controlled to not emit light, or, during fingerprint identification, brightness of display pixels in the fingerprint identification bright zone is controlled to be higher than that of display pixels in the fingerprint identification dark zone.

7. The fingerprint identification apparatus according to claim 1, wherein the control circuit is further configured to:
determine a center of the touch zone;
determine the fingerprint identification bright zone by taking the center of the touch zone as an origin; and
take a plurality of rows or columns of display pixels adjacent to a part of display pixels at the outermost periphery of the fingerprint identification bright zone as the fingerprint identification dark zone,
wherein an area of the fingerprint identification bright zone is a preset area, or an area of the fingerprint identification bright zone is determined according to an area of the touch zone and is greater than or equal to a first area threshold; or the control circuit is further configured to:
determine an edge zone of the touch zone;
determine at least part of the edge zone as the fingerprint identification dark zone; and
determine the fingerprint identification bright zone based on the fingerprint identification dark zone and the touch zone.

8. A fingerprint identification method, comprising:
acquiring a touch signal of a finger to be identified on a display component;
determining a touch zone of the finger to be identified based on the touch signal;
determining a fingerprint identification bright zone and a fingerprint identification dark zone on the display component based on the touch zone, wherein the fingerprint identification dark zone is close to and at least partially surrounds the fingerprint identification bright zone;
acquiring a bright zone fingerprint detection signal corresponding to the fingerprint identification bright zone and a dark zone fingerprint detection signal corresponding to the fingerprint identification dark zone; and
performing a fingerprint identification of the finger to be identified based on the bright zone fingerprint detection signal and the dark zone fingerprint detection signal.

9. The fingerprint identification method according to claim 8, further comprising:
performing a true/false finger detection of the finger to be identified based on the bright zone fingerprint detection signal and the dark zone fingerprint detection signal.

10. The fingerprint identification method according to claim 8, wherein the fingerprint identification of the finger to be identified is performed based on a difference between the bright zone fingerprint detection signal and the dark zone fingerprint detection signal.

11. The fingerprint identification method according to claim 10, wherein the fingerprint identification of the finger to be identified is performed based on a difference between a single fingerprint detection signal of the fingerprint identification bright zone and a single fingerprint detection signal of the fingerprint identification dark zone; or, the fingerprint identification of the finger to be identified is performed based on a difference between a single fingerprint detection signal of the fingerprint identification bright zone and an average of a plurality of fingerprint detection signals of the fingerprint identification dark zone; or, the fingerprint identification of the finger to be identified is performed based on a difference between an average of a plurality of fingerprint detection signals of the fingerprint identification bright zone and an average of a plurality of fingerprint detection signals of the fingerprint identification dark zone, wherein the average is an arithmetic average or a weighted average.

12. The fingerprint identification method according to claim 9, wherein the bright zone fingerprint detection signal includes a first bright zone fingerprint detection signal corresponding to a convex part of the fingerprint and a second bright zone fingerprint detection signal corresponding to a concave part of the fingerprint, and the dark zone fingerprint detection signal includes a first dark zone fingerprint detection signal corresponding to a convex part of the fingerprint and a second dark zone fingerprint detection signal corresponding to a concave part of the fingerprint, wherein performing the true/false finger detection of the finger to be identified based on the bright zone fingerprint detection signal and the dark zone fingerprint detection signal further comprises:

performing the true/false finger detection of the finger to be identified based on a first difference between the first bright zone fingerprint detection signal and the second bright zone fingerprint detection signal corresponding to the fingerprint identification bright zone, and a second difference between the first dark zone fingerprint detection signal and the second dark zone fingerprint detection signal corresponding to the fingerprint identification dark zone.

13. The fingerprint identification method according to claim 12, further comprising: determining that the finger to be identified is a true finger in any one of the following situations:

the first difference is greater than the second difference;

a difference between the first difference and the second difference is greater than a first threshold;

a ratio of the first difference to the second difference is greater than a second threshold;

a ratio of the difference between the first difference and the second difference to the first difference or the second difference is greater than a third threshold.

14. The fingerprint identification method according to claim 12, wherein the first bright zone fingerprint detection signal, the second bright zone fingerprint detection signal, the first dark zone fingerprint detection signal and the second dark zone fingerprint detection signal are acquired by detecting light with a specific wavelength.

15. The fingerprint identification method according to claim 8, wherein the fingerprint identification bright zone is a circular zone, an elliptical zone or a rectangular zone, and the fingerprint identification dark zone includes a plurality of rows or columns of display pixels adjacent to a part of display pixels at the outermost periphery of the fingerprint identification bright zone, wherein during fingerprint identification, display pixels in the fingerprint identification bright zone are controlled to emit light, and display pixels in the fingerprint identification dark zone are controlled to not emit light, or, during fingerprint identification, brightness of display pixels in the fingerprint identification bright zone is controlled to be higher than that of display pixels in the fingerprint identification dark zone.

16. The fingerprint identification method according to claim 8, wherein the display component includes a plurality of display sub-zones, each display sub-zone includes a plurality of display pixels, the fingerprint identification bright zone is associated with at least one display sub-zone of the plurality of display sub-zones, and the fingerprint identification dark zone is associated with at least one display sub-zone of the plurality of display sub-zones.

17. The fingerprint identification method according to claim 8, wherein determining the fingerprint identification bright zone and the fingerprint identification dark zone on the display component based on the touch zone further comprises:

determining a center of the touch zone;

determining the fingerprint identification bright zone by taking the center of the touch zone as an origin; and taking a plurality of rows or columns of display pixels adjacent to a part of display pixels at the outermost periphery of the fingerprint identification bright zone as the fingerprint identification dark zone, wherein an area of the fingerprint identification bright zone is a preset area, or an area of the fingerprint identification bright zone is determined according to an area of the touch zone and is greater than or equal to a first area threshold.

18. The fingerprint identification method according to claim 8, wherein determining the fingerprint identification bright zone and the fingerprint identification dark zone on the display component based on the touch zone further comprises:

determining an edge zone of the touch zone;

determining at least part of the edge zone as the fingerprint identification dark zone; and determining the fingerprint identification bright zone based on the fingerprint identification dark zone and the touch zone.

19. The fingerprint identification method according to claim 18, further comprising:

determining an area of the touch zone;

wherein the edge zone of the touch zone is determined based on the touch zone in a case where the area of the touch zone is smaller than a second area threshold.

20. An electronic product which realizes fingerprint identification by the fingerprint identification method according to claims 8.

* * * * *